United States Patent [19]
Page

[11] Patent Number: 5,107,189
[45] Date of Patent: Apr. 21, 1992

[54] RGB VIDEO AMPLIFIER SYSTEM INTEGRATING BLANKING AND BRIGHTNESS CONTROL TRACKING

[75] Inventor: Ronald W. Page, Sunnyvale, Calif.

[73] Assignee: National Semiconductor Corporation, Santa Clara, Calif.

[21] Appl. No.: 655,704

[22] Filed: Feb. 15, 1991

[51] Int. Cl.$^5$ .............................................. H01J 29/52
[52] U.S. Cl. ..................................... 315/383; 358/34
[58] Field of Search ................... 315/383, 384; 358/34, 358/33

[56] References Cited
U.S. PATENT DOCUMENTS 4,811,101  3/1989  Yagi ........................................ 358/34

*Primary Examiner*—Theodore M. Blum
*Attorney, Agent, or Firm*—Gail W. Woodward; Irving S. Rappaport; James W. Rose

[57] ABSTRACT

An RGB video display terminal (VDT) is disclosed and the color cathode ray tube (CRT) driver circuits detailed. The driver circuits include a common video gain control which can be varied over a wide range without changing the DC bias level. Each CRT gun can have its driver gain separately controlled over a vernier range and its DC bias can be separately controlled. The video amplifier is AC coupled to the video input and includes a DC reinsertion circuit which clamps the DC bias at a level related to the composite video level immediately following the sync pulse. Therefore, the DC reinsertion is clamped for each scanning line at the CRT black level. The video amplifier also includes a blanking circuit which turns the CRT guns off during the VDT retrace interval. Thus, the driver circuits can drive the CRT guns in a manner that will simultaneously control their operation for the color display and yet take into account the manufacturing tolerance in individual gun characteristics.

8 Claims, 4 Drawing Sheets

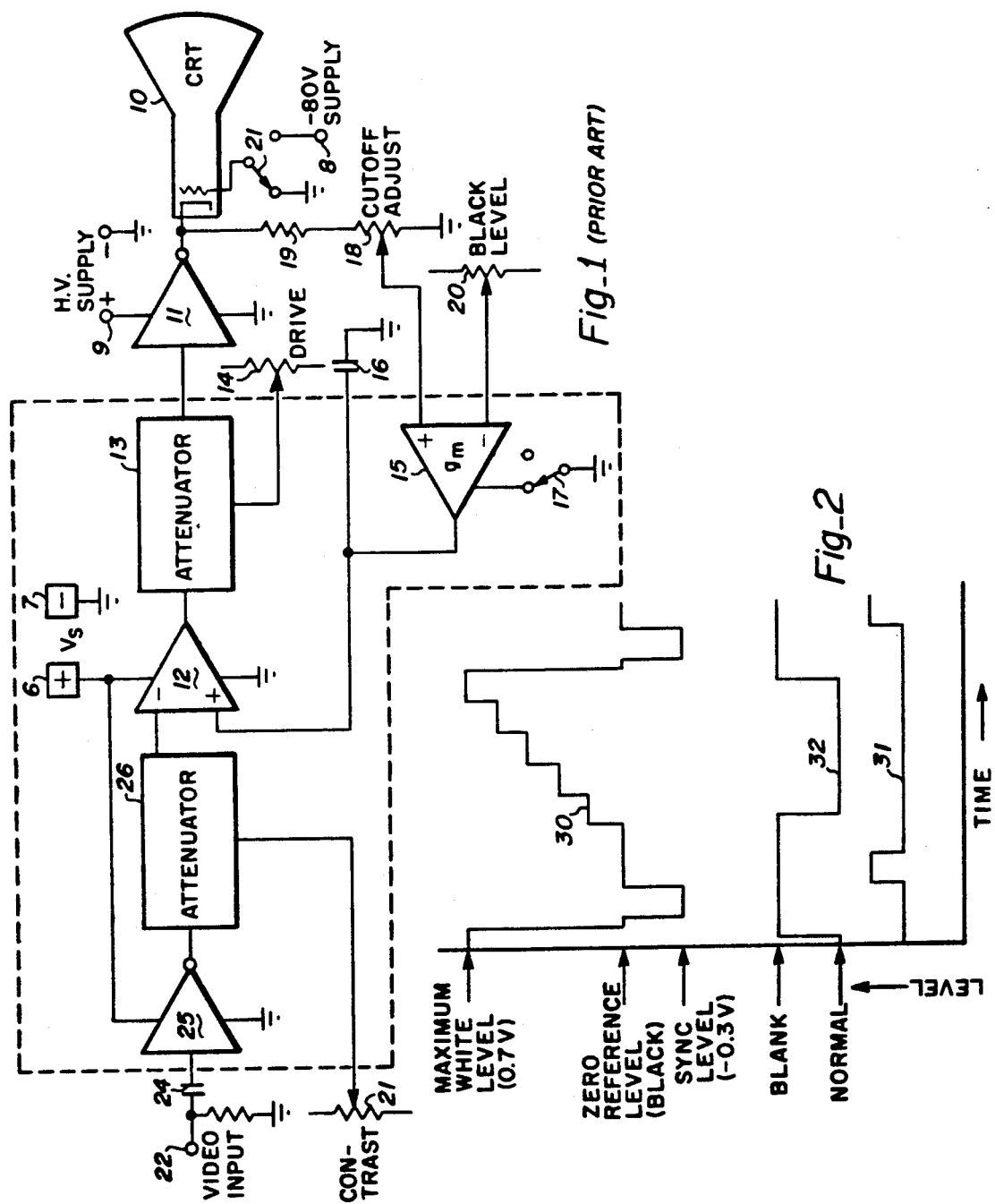
Fig_1 (PRIOR ART)
Fig_2

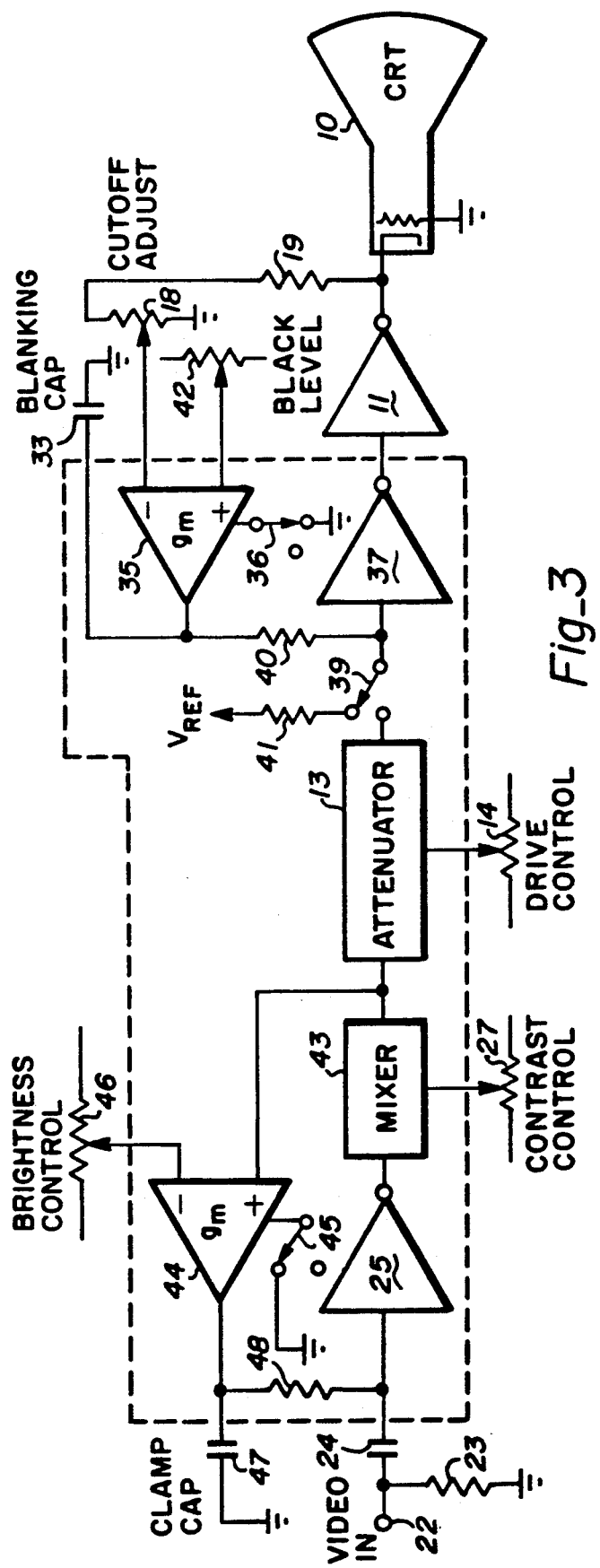
Fig_3

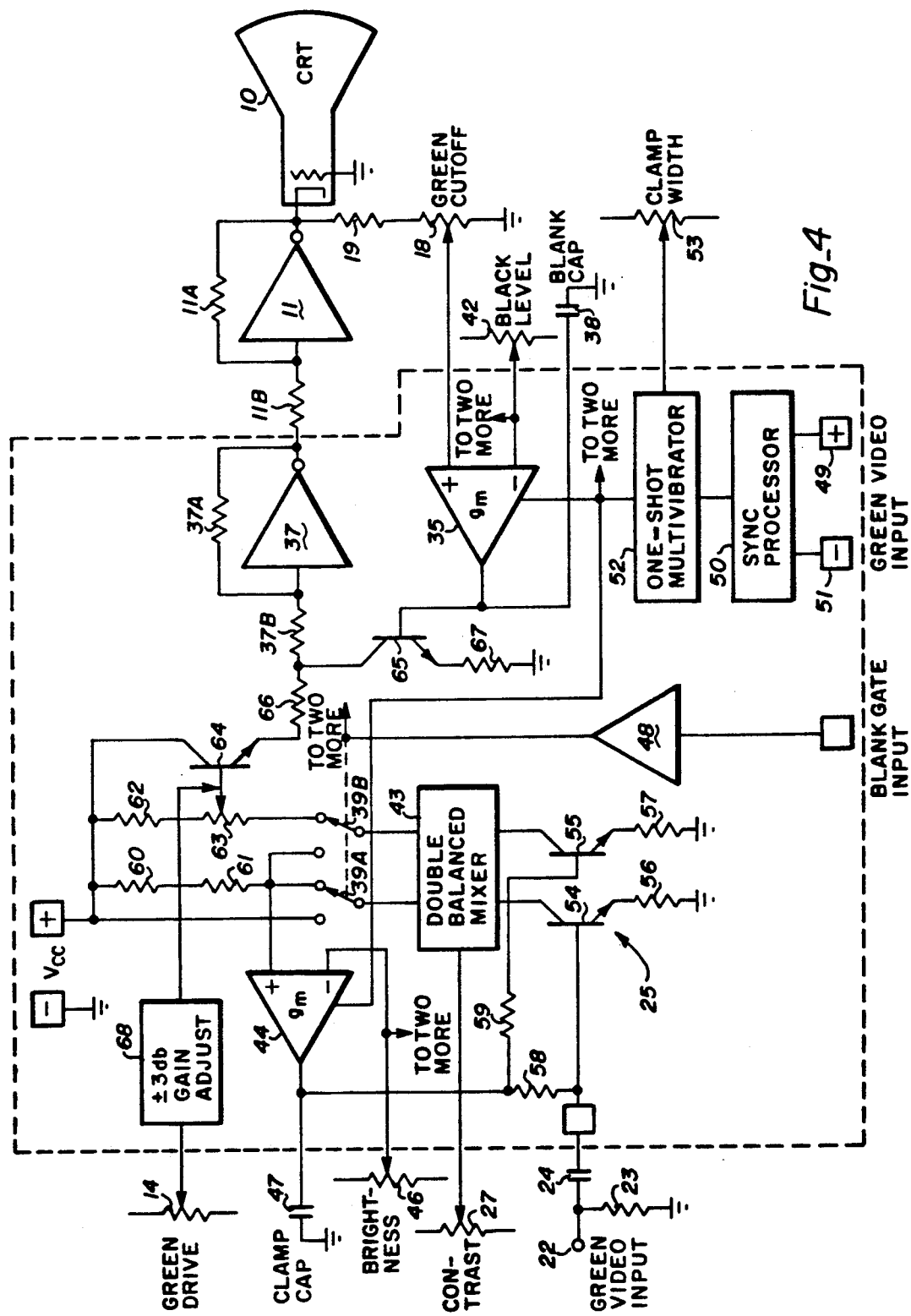
Fig_4

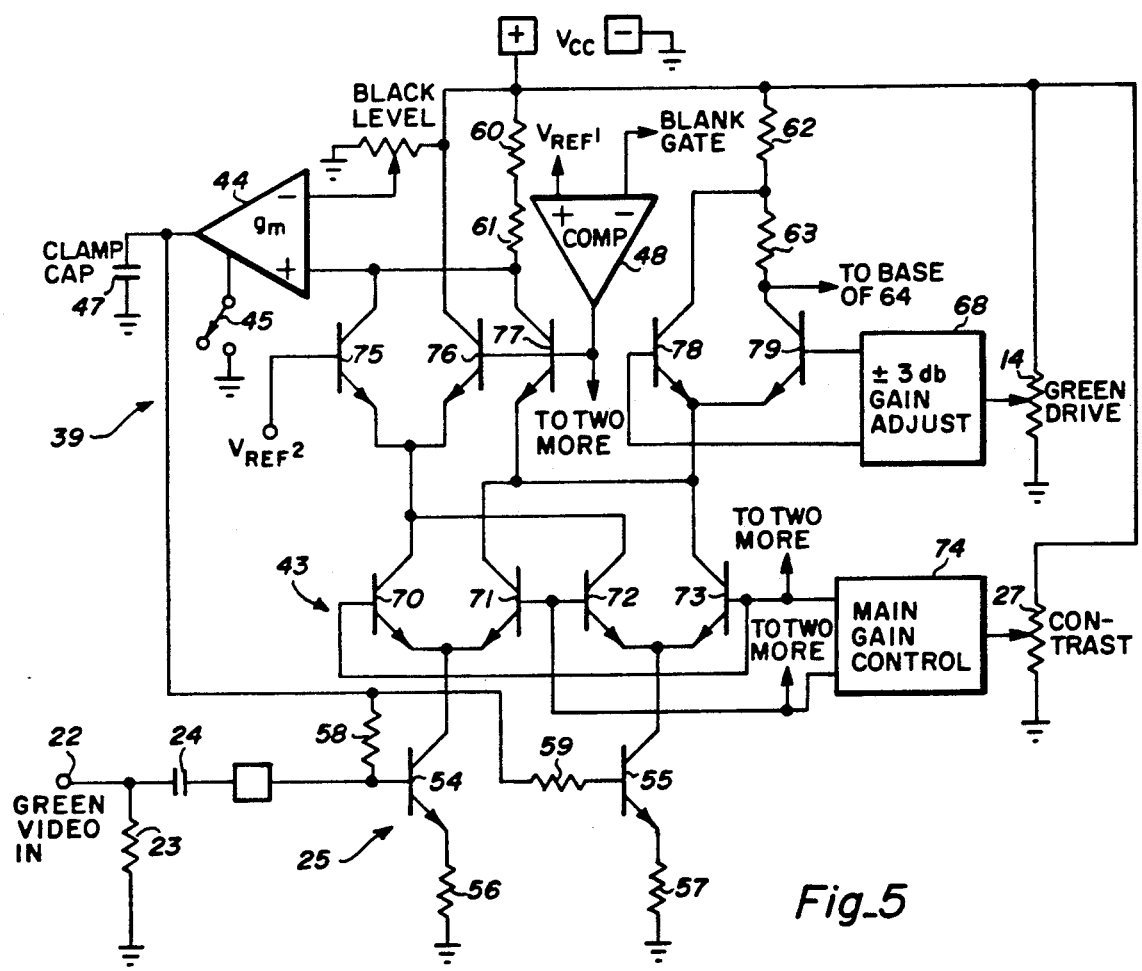
Fig_5

RGB VIDEO AMPLIFIER SYSTEM INTEGRATING BLANKING AND BRIGHTNESS CONTROL TRACKING

BACKGROUND OF THE INVENTION

The invention relates to color video display terminal (VDT) devices that employ cathode ray tube (CRT) screens. Typically, such CRT's involve three primary color cathode ray guns which are manipulated to converge on a screen that produces the color image. The three guns produce converged scanning rasters having red, green and blue fields which combine to produce white light. The typical scanning raster is an interleaved left to right horizontal and top to bottom vertical scan operated in accordance with the National Television Standards Committee (NTSC) requirements adopted by the FCC for commercial color television.

Each of the three CRT guns must be supplied with the correct video signal and DC bias controls so that the required image will appear on the screen. Typically, a CRT cathode is supplied with a 60-volt video signal. (It is to be noted that where signals are to be described in this specification, the numbers will be in terms of peak-to-peak values.) A video amplifier is incorporated with a preamplifier and video driver to produce a signal gain of about 120 so that a one-half volt video input is required. Each of the three required amplifier channels will have individual gain controls which act as vernier drive controls. These controls have a relatively limited range of control and can be set to accommodate the characteristics of the particular CRT guns involved. This is necessary because the manufacturing tolerances of the CRT result in different control voltage requirements. Once the drive controls are set in the three channels they will compensate the individual gun characteristic differences and will not need to be adjusted further. In addition, the three channels will have a common gain control which determines the picture contrast. Once the three drive controls are set initially, when the contrast control is varied, the three channels should track each other.

Each of the three channels should have a cutoff bias adjustment which sets the DC level at the CRT cathode to define the black reference level. This adjustment, which is also related to the CRT characteristics, is also set once to allow for the CRT manufacturing tolerances. The three channels also have a common DC bias control that permits setting the DC cathode voltages unison to the desired reference or "black level" and, therefore, functions as a picture brightness control. Once the individual cutoff controls are adjusted the three guns should track each other in response to the brightness control setting.

Still another DC level control, called the cutoff adjust, is common to the three channels. It acts to set the blanking level of the three guns below the so-called black reference level of the display. This assures a "blank" VDT screen during the blanking interval. The video amplifier normally includes a DC restoration circuit that automatically adjusts the DC signal level so that the blanking signal level in the composite video is established as the reference level. Thus, if the three guns are biased to cutoff at the blanking level position, signal values are seen as picture elements and the negative synch pulses are not presented. This means that an input AC coupled signal is clamped so that the DC level is referenced to the blanking pulse and a DC reinsertion is thereby accomplished. With respect to the composite video, this is done by means of a clamp circuit that is gated on just after the trailing edge of the horizontal sync pulse. Thus, the gate interval exists upon the back porch of the horizontal blanking pulse of the composite video. During this gate pulse interval the video DC level is sampled and a capacitor charged to the sample value. The capacitor charge is applied to the video amplifier thereby providing a DC bias level that persists during the interval between sample pulses. Thus, as the composite video levels change, the DC level during blanking is held constant and the desired DC insertion is achieved.

DESCRIPTION OF THE INVENTION

FIG. 1 is a simplified block diagram of the conventional prior art RGB video amplifier system.

FIG. 2 is a graph showing the video input signal, the clamp signal and the retrace blanking signal.

FIG. 3 is a simplified block diagram of the RGB video amplifier system of the invention.

FIG. 4 is a more detailed block-schematic diagram of the RGB video amplifier system of the invention.

FIG. 5 is a schematic-block diagram of the double balanced mixer and switch section of FIG. 4.

DESCRIPTION OF THE PRIOR ART

FIG. 1 is a simplified block diagram of the LM1203 prior art approach to RGB video amplifiers. The LM1201 version is a single channel device intended for monochrome displays. The elements inside the dashed outline represent the IC components found in the LM1201/LM1203 while the elements outside of the dashed outline represent exterior components. A CRT 10 denotes one color gun in a VDT and shows the cathode and grid symbols for that gun. The cathode is driven from an amplifier 11 which could typically be an LH2416 or LH2426. With an 80-volt supply such an amplifier can easily supply a wide band 60-volt video signal to the CRT cathode. It requires a 4-volt drive signal thus typically producing a voltage gain of about 15.

Inside the IC, amplifier 12 drives amplifier 11 by way of an attenuator 13 which has a vernier control 14 that acts to set the signal drive over a relatively small range. The video signal is applied to the inverting input of amplifier 12. The noninverting input of amplifier 12 receives an input from $g_m$ amplifier 15. Capacitor 16 bypasses the noninverting input of amplifier 12 so that only DC is present. When switch 17 is closed, $g_m$ amplifier 15 will quickly charge capacitor 16 which acts to set the DC bias level of the video channel. It will be noted that a cutoff adjust control 18 is coupled to the CRT 10 cathode by means of resistor 19. Thus, cutoff adjust control 18 provides the noninverting input of $g_m$ amplifier 15 while black level control 20 provides the inverting input.

It can be seen that when switch 17 is closed, a DC negative feedback loop is present around amplifiers 11 and 12. Capacitor 16 will be charged by the output of $g_m$ amplifier 15 to that point where the two inputs to $g_m$ amplifier 15 are equalized. This DC level will clearly be determined by the settings of controls 18 and 20.

Terminal 22 constitutes the video signal input which is terminated by resistor 23. Capacitor 24 AC couples the video signal to amplifier 25. Attenuator 26 couples the output of amplifier 25 to the inverting input of amplifier 12. Contrast control 27 adjusts the action of attenuator 26 thereby adjusting the gain of the video signal channel. The overall gain of the video channel from terminal 22 to the input of amplifier 11 is about eight. This includes the gain factors of amplifiers 12 and 25 along with the attenuation values of attenuators 13 and 26. Thus, a one-half volt minimum video signal is required at terminal 22.

FIG. 2 is a graph showing the critical elements of the circuit waveforms. Waveform 30 is a stylization of a composite video input signal. The reference level shown is what is called the black level. Desirably, when the signal is at this level the cathode of CRT 10 is at the beam current cutoff level. The maximum positive level is representative of the maximum CRT beam current. The lowest waveform element represents the horizontal sync pulse which operates when the CRT beam is cut off during retrace and, thus, forms no part of the CRT display. While the drawing shows six discrete video values, the actual system produces a continuum of values from black level to maximum brightness.

Waveform 31 shows a gating signal that is developed just following the synch pulse. This gating pulse is located on the "back porch" of the composite video signal and is employed to operate switch 17 of FIG. 1. When the gating pulse is high switch 17 is closed and $g_m$ amplifier 15 is operative. Thus, the negative feedback loop described above is operative only during the early portion of the back porch period of the composite video waveform. This means that capacitor 16 is charged to a level that represents video black each time the CRT scans a horizontal line. Using NTSC standards this occurs at a 15750 cycle rate.

Waveform 32 represents a blanking pulse that is derived from the display scanning circuits in a manner well known in color TV receivers. This waveform is employed to operate a switch 21 which switches the control grid of CRT 10 between ground and −80 volts. When waveform 32 is high, the control grid is at −80 volts and the CRT 10 is blanked. At other times, when waveform 32 is low, the grid is at ground potential and the CRT 10 can be turned on to a degree determined by its cathode voltage.

It would be desirable to apply the blanking waveform to the video channel and to ground the CRT 10 control grid. However, this would involve an 80-volt positive pulse applied to the cathode. Clearly, this would require the output of amplifier 11 to rise to its supply voltage. Such amplifier pegging results in the output stage being driven into saturation. Unfortunately, such a condition produces a time delay before the output stage can recover. This severly limits the video performance of amplifier 11 for a period of time following the blanking pulse. Hence, CRT 10 control grid blanking, as described above, has been preferred in the prior art.

DESCRIPTION OF THE INVENTION

FIG. 3 is a simplified block diagram of the system of the invention. Where the elements function the same as in FIG. 1, the same reference numerals are used. As was the case in FIG. 1, one color CRT channel is shown even though three such channels are employed to drive an RGB color CRT. The video signal channel blanking circuit operates as follows.

Cutoff adjust control 18, which operates the same as the cutoff adjust control in FIG. 1, supplies a variable fraction of the DC CRT 10 cathode voltage to the inverting input of $g_m$ amplifier 35. Switch 36, when closed, renders $g_m$ amplifier 35 operative and when open deactivates it. Amplifier 11 is driven from video amplifier 37 which has its input biased by the charge on capacitor 38. Switch 39 is a double-throw device operated by the system blanking pulse. This produces waveform 32 of FIG. 2. During the blanking pulse internal switch 39 is in the upward position as shown. Otherwise, between blanking pulse intervals, switch 39 will be down so as to complete the video channel. Switch 36 will be turned on by clamp pulse waveform 31 of FIG. 2 so that $g_m$ amplifier 35 is rendered active only during the blanking interval. During the blanking interval, when switch 39 is in its upward position, the input bias applied to amplifier 37 will produce a positive blanking pulse at the cathode of CRT 10. The value of capacitor 38 is selected to be large enough that the charge does not vary appreciably from one CRT scan line to the next. The blanking pulse developed at the input of amplifier 37 will appear amplified at the cathode of CRT 10. It can be seen that, when switch 36 is activated by the clamp pulse, capacitor 38 will quickly be charged by $g_m$ amplifier 35 to a value that will cause the inverting and noninverting inputs to be equal. Since these inputs are supplied respectively by the potential of cutoff adjust control 18 and the potential of black level control 42 the magnitude of the blanking pulse at the cathode of CRT 10 is above the black display level and, therefore, well controlled. Since the magnitude of this blanking pulse can be controlled so as to avoid pegging of amplifier 11, the problems associated with the prior art are thereby eliminated.

Attenuator 13 and the vernier drive control 14 are located ahead of switch 39 and they function with respect to the video channel as they did in FIG. 1. The video channel further includes a double balanced mixer 43 which is operated in part by contrast control 27 which in effect varies the signal transmissivity of mixer 43. Video amplifier 25 operates as does its counterpart in FIG. 1 and receives its input in the form of an AC coupled input from capacitor 24.

A $g_m$ amplifier 44 is the heart of the DC restoration channel which operates as follows. The noninverting input of $g_m$ amplifier 44 is connected to receive the signal at the output of mixer 43 and the inverting input is connected to a common brightness control 46. Switch 45 renders $g_m$ amplifier 44 operative during the clamp period as shown by waveform 31 of FIG. 2. Thus, capacitor 47 will quickly be charged to establish that DC bias level of amplifier 25 where the DC level at the output of mixer 43 equals the potential developed by brightness control 46. Resistor 48 isolates capacitor 47 from the video signal channel while permitting the charge on capacitor 47 to DC bias amplifier 25. Capacitor 47 is made large enough so that it does not change its charge appreciably from one horizontal line to the next. From the foregoing description it is clear that the zero reference of the composite video is controlled to be at a DC level determined by the brightness control. The AC video level is determined mainly by contrast control 27 which varies AC gain and the vernier drive control 14 which varies the AC and DC gain over a small range.

FIG. 4 is a more detailed block-schematic diagram showing the various elements. Again, where the various elements are the same as the previous figures, the same designations will be used. As before, the on-chip IC elements are set apart by a dashed outline. In the prototype circuit the green video channel was employed as the source of common controls. Accordingly, where the legend "to two more" is employed, the red and blue sections are being referred to. The green video signal is also applied at terminal 49 to sync processor 50. Terminal 51 will accept an external input so that either signal polarity can be accommodated. Sync processor 50 also triggers a one shot multivibrator 52 at the trailing edge of the horizontal sync pulse. This produces the clamp pulse of waveform 31 in FIG. 2. Thus, the oneshot multivibrator 52 performs the function of switches 36 and 45 in controlling the on time of $g_m$ amplifiers 35 and 44. Control 53 determines the width of the clamp pulse thus providing a useful feature to the IC user. Ordinarily, the clamp pulse width should be as narrow as possible. In fact, its width can approximate that of the sync pulse. However, in the event that the display may be associated with a color TV transmission, where the composite video could include a color burst on the back porch. Such a burst provides the reference phase that permits the TV receiver to lock a subcarrier oscillator in phase with the color oscillator at the TV transmitter. This is necessary in the proper demodulation of the TV color signals. Control 53 can be set so that the clamp pulse width is wide enough to span the entire color burst. Thus, due to the integrating function of capacitor 47, the color burst in the composite video will be averaged out and the DC level of the back porch unaffected.

Amplifiers 11 and 37 each have their gain controlled by negative feedback. Resistors 11A and 11B control the gain of amplifier 11 and resistors 37A and 37B control the gain of amplifier 37.

The mixer 43 is shown as a double-balanced device. Two of its inputs are obtained from the collectors of transistors 54 and 55. Since these transistors are common emitter connected, they can provide gain which is a component of amplifier 25 of FIG. 3. Resistors 56 and 57 respectively degenerate transistors 54 and 55, while resistors 58 and 59 isolate the bases of transistors 54 and 55. The output of $g_m$ amplifier 44 (and capacitor 47) provides the bias reference for controlling the current flowing in transistors 54 and 55 and, thus, the inputs to mixer 43. Two outputs from mixer 43 are shown being controlled by switches 39A and 39B. These two SPDT switches form a DPDT switch which actually performs the function of switch 39 of simplified FIG. 3. These two switches are shown in their normal state which is between the blanking pulses of waveform 32 of FIG. 2. Switches 39A and 39B are operated by the blanking pulses generated in blanking gate comparator 48. This comparator receives the complement of the blanking gate waveform. During blanking the switches will be moved to their left hand position. In the normal state shown resistors 60–63 comprise the load for mixer 43. Transistor 64 comprises an output pull-up element and transistor 65 comprises an output pull-down element. Resistors 66 and 67, respectively, degenerate transistors 64 and 65. Together transistors 64 and 65 provide dc level shifting and act as a buffer for receiving the single-ended output for mixer 43. This buffer stage comprises the input to amplifier 37.

Contrast control 27 operates upon the functioning of mixer 43 so as to vary its effective transmissivity. This, in effect, is the function of variable attenuator 13 of FIG. 3. The variable attenuator action will alter the AC video signal level without changing its DC level. Thus, control 27 varies only picture contrast without varying brightness. It can be seen that any DC errors in mixer 43 will be corrected by the periodic action of $g_m$ amplifier in the feedback loop that sets the charge on capacitor 47 as described above.

When switches 39A and 39B are in their normal position as shown, resistor 63 is operated as a variable element. When the variable arm is at its upward point only resistor 62 will provide the output from mixer 43. When the arm is at its lower position the load resistance value will be effectively doubled because resistors 62 and 63 are matched. In terms of signal voltage, this represents a 6 db variation. Block 68 is designated as the control of the variable arm of resistor 63 and is operated by drive control 14. Thus, control 14 will vary the attenuation of mixer 43 over a ±3 db range. As will be shown subsequently, this gain adjustment is achieved without varying the DC level.

When switches 39A and 39B are moved to their left hand (or blanking) position, resistors 60 and 61 become the sole mixer 43 load and the signal transmission to transistor 64 is interrupted. In this state $g_m$ amplifier 44, when switched on by the clamping pulse from multivibrator 52, will charge capacitor 47 until the noninverting input matches the potential developed by brightness control 46. This means that the currents in transistors 54 and 55 are controlled as a function of the brightness level and this level is reestablished each time a display picture horizontal line is produced. While capacitor 47 must supply the base currents for transistors 54 and 55, its value is made large enough that its charge is not varied appreciably from line to line.

Also, during the blanking interval, $g_m$ amplifier 35 is switched on. It will quickly charge capacitor 38 to a level that controls the conduction in transistor 65, which sets the dc bias level of amplifier 37 to create a negative feedback loop around capacitor 38. The charge will be adjusted to that level which will result in the potential at the noninverting input of $g_m$ amplifier 35 equaling the potential developed by black level control 42. Thus, while transistor 64 pulls the collector of transistor 65 up, the actual level will be set by the charge of capacitor 38. While capacitor 38 must supply the base current flowing in transistor 65, when $g_m$ amplifier 35 is off, the capacitor value is made large enough that the charge voltage does not vary appreciably from display line to line.

FIG. 5 is a detailed schematic-block diagram of the double-balanced mixer and associated elements of FIG. 4. Where the elements appear in earlier figures, the same numerals are used. Transistors 70–73 form double balanced mixer 43. Transistors 70 and 71 are commonly supplied with current from transistor 54 and transistors 72 and 73 are commonly supplied with current from transistor 55. Transistors 70 and 72 form one mixer output and transistors 71 and 73 form the other mixer output. The bases of transistors 70 and 73 are differentially operated with respect to the bases of transistors 71 and 72 by means of gain control circuit 74 which involves well known bias control elements operated from contrast control 27. In its mid-range contrast control position control 74 causes balance mixer 43 to operate in a balanced mode. As the contrast control is varied the output can be shifted between the two outputs over a wide range of levels. Since only one input (transistor 54) contains video information, balanced mixer 43 will supply a wide output range of signal level to variable load resistor 63 and hence to the base of transistor 64. While the video signal value is varied over a wide range the DC level at the output remains constant. This is due to the fact that as the conduction in transistor 71, which contains the video and the DC, is decreased the conduction in transistor 73, which carries only the DC, is increased proportionately.

Transistors 75-79 form the double pole double throw switch function of elements 39A and 39B of FIG. 4. Transistors 78 and 79 additionally provide the ±3 db vernier control afforded by green drive control 14. Control circuits 68, which are of well known configuration, differentially bias transistors 78 and 79. In one extreme, when conduction in transistor 78 dominates that in transistor 79, only load 62 is functional. In the other extreme, when conduction in transistor 79 dominates that in transistor 78, the effective load is resistors 62 and 63 in series. If these resistors are equal in value the value of load resistance goes from one to two units. This varies the load voltage drop over a similar range. Such a two-to-one voltage range represents a 6 db or ±3 db range.

The switching operates as follows. Comparator 48 is provided with the blanking gate complement at its inverting input. The noninverting input is supplied with a $V_{REF1}$ bias. If $V_{REF1}$ is operated at about 1.4 volts, the comparator functions in response to TTL logic levels. Thus, the output of comparator 48 is a reproduction of the blanking gate signal.

Transistor 75 has its base connected to $V_{REF2}$ which is set midway to the logic swing at the output of comparator 48 which has its output connected to the bases of transistors 76 and 77. During the blanking interval, transistor 75 will be off and transistors 76 and 77 will be on. Thus, the collectors of transistors 70 and 72 will be coupled to $V_{CC}$ by way of transistor 76. Transistor 77 couples the collectors of transistors 71 and 73 to the noninverting input of $g_m$ amplifier 44 and at the same time pulls the emitters of transistors 78 and 79 up so as to turn them off. This in turn disconnects the base of transistor 64 from mixer 43. As a result, resistors 62 and 63 no longer have current flowing in them thereby pulling the base of transistor 64 up close to $V_{CC}$. This, by way of amplifiers 11 and 37, will blank CRT 10.

In the interval between blanking intervals the output of comparator 48 is low. This turns transistors 76 and 77 off while turning transistor 75 on. Transistor 75 couples the collectors of transistors 70 and 72 to load resistors 60 and 61. Since transistor 77 is off the collectors of transistors 71 and 73 will fall to a level that will turn transistors 78 and 79 on. Thus, the collectors of transistors 71 and 73 will be coupled to the base of transistor 64 which thereby operates at the DC level dictated by the current flowing in transistors 54 and 55. Under these conditions, transistors 78 and 79 function, as described above, in response to the vernier green drive control 14.

EXAMPLE

The circuit described above in FIGS. 3 through 5 was constructed as an IC that is to be produced commercially as the LM1204. The IC is formed using conventional monolithic silicon PN junction isolated construction. The components on the chip includes high performance vertical NPN transistors. Amplifier 11 was one amplifier in a conventional hybrid construction LH2426.

The following chart shows the component values of the other circuit elements:

| COMPONENT | VALUE |
| --- | --- |
| Resistor 11A | 3K ohms |
| Resistor 11B | 250 ohms |
| Resistor 18 | 10K ohms |
| Resistor 19 | 100K ohms |
| Resistor 23 | 75 ohms |
| Capacitor 24 | 10 microfarads |
| Resistor 37A | 5K ohms |
| Resistors 37B and 60-63 | 500 ohms |
| Capacitors 38 and 47 | 0.1 microfarads |
| Resistors 56, 57 and 67 | 1K ohms |
| Resistors 58 and 59 | 20K ohms |
| Resistor 66 | 2K ohms |

The IC video channel had excellent bandwidth performance. It displayed a 4-volt signal output at amplifier 37 having rise and fall times of 2.5 ns. This represents a video power bandwidth of about 140 MHz. The DC reinsertion accurately compensated the composite video reference level at black level. At the cathode of CRT 10 the blanking pulse level was about 52 volts dc and the video amplifier showed no delay in recovery following blanking.

The invention has been described and a preferred embodiment detailed. When a person skilled in the art reads the foregoing description, alternatives and equivalents, within the spirit and intent of the invention, will be apparent. Accordingly, it is intended that the scope of the invention be limited only by the claims that follow.

I claim:

1. A cathode ray tube (CRT) display driver, including amplifying means for receiving and amplifying an AC composite video signal input to a level suitable to operate said CRT in excess of its range of cutoff to maximum current level, said CRT display including scanning means for developing a viewing raster that is blanked during its retrace period, said amplifying means further including:
   DC reinsertion means for establishing the DC bias level of said CRT at that level of said composite video signal at which said CRT is cut off;
   variable attenuation means whereby the gain of said amplifying means can be varied over a substantial range without shifting its DC bias; and
   means for switching said amplifying means output to a level that will blank said CRT during the retrace period of said display.

2. The display driver of claim 1 wherein said DC reinsertion means includes a first amplifier stage having a DC bias level determined by the charge on a first capacitor and means are included for charging said first capacitor to a potential that is related to the DC level of said composite video signal immediately following the sync pulse.

3. The display driver of claim 2 wherein said first capacitor is charged by a second amplifier stage that is gated on during a clamp period that is timed to occur between the end of the sync pulse on said composite video and the end of said retrace period.

4. The display driver of claim 3 further including means for adjusting the duration of said clamp period.

5. The display driver of claim 3 wherein said variable attenuation means includes a double balanced mixer having a video signal input, a DC bias input, a control input and an output wherein the video signal level at said output can be varied, as a function of said control input, without varying the DC level of said output.

6. The display driver of claim 5 further including a vernier signal level control means whereby the gain of said amplifying means can be varied over a range that is small with respect to the range afforded by said variable attenuation means.

7. The display driver of claim 5 wherein said amplifying means includes an output section which produces substantial gain and further includes biasing means that can be switched between two levels, said two levels representing the normal signal biasing and the blanking level bias wherein the blanking level bias is sufficient to turn off the current flow in said CRT.

8. The display driver of claim 7 wherein said output section includes a third amplifier stage that is biased by a second capacitor charge in said normal signal biasing state and said second capacitor charge is developed by way of a fourth amplifier stage that is gated on in synchronism with said second amplifier stage whereby said third amplifier stage provides negative feedback around said output section and stabilizes it during said clamp period.

* * * * *